(12) United States Patent
Pregnolato et al.

(10) Patent No.: US 8,505,402 B2
(45) Date of Patent: Aug. 13, 2013

(54) GEAR CHANGE DEVICE FOR A MOTOR VEHICLE

(75) Inventors: Gianluigi Pregnolato, Orbassano (IT); Valter Pastorello, Orbassano (IT); Marco Garabello, Orbassano (IT); Andrea Piazza, Orbassano (IT)

(73) Assignee: C.R.F. Societa Consortile per Azioni, Orbassano (Turin) (IT)

( * ) Notice: Subject to any disclaimer, the term of this patent is extended or adjusted under 35 U.S.C. 154(b) by 130 days.

(21) Appl. No.: 13/217,410

(22) Filed: Aug. 25, 2011

(65) Prior Publication Data
US 2012/0234119 A1  Sep. 20, 2012

(30) Foreign Application Priority Data
Mar. 15, 2011  (EP) .................................. 11158282

(51) Int. Cl.
*F16H 3/08* (2006.01)
(52) U.S. Cl.
USPC .............................................. 74/331; 74/330
(58) Field of Classification Search
USPC .................................... 74/330, 331, 333, 340
See application file for complete search history.

(56) References Cited

U.S. PATENT DOCUMENTS

| | | | | |
|---|---|---|---|---|
| 7,331,897 B2 * | 2/2008 | Ibamoto et al. | ............... | 475/221 |
| 7,866,232 B2 * | 1/2011 | Gitt et al. | ......................... | 74/745 |
| 8,161,835 B2 * | 4/2012 | Borntrager | ...................... | 74/331 |
| 8,360,919 B2 * | 1/2013 | Kraynev et al. | ............... | 475/207 |
| 2010/0294059 A1 | 11/2010 | Singh et al. | | |

FOREIGN PATENT DOCUMENTS

JP  2005054888 A  3/2005
KR  20100062642 A  6/2010

* cited by examiner

*Primary Examiner* — Ha D Ho
(74) *Attorney, Agent, or Firm* — Heslin Rothenberg Farley & Mesiti P.C.; Victor A. Cardona, Esq.

(57) ABSTRACT

A gear change device for a motor vehicle includes a first and a second primary shaft coaxial with respect to each other, selectively connectable to the driving shaft of the motor vehicle, and a first and a second secondary shaft, whose axes are parallel and spaced from the common axis of said primary shafts. A fifth shaft is parallel and spaced with respect to the common axis of the two primary shafts and with respect to the axes of the two secondary shafts. A parking gear wheel is connected in rotation with the further pinion and cooperates with a locking device in a parking condition. The parking gear wheel is mounted freely rotatable around the axis of the fifth shaft. The parking gear wheel extends radially towards the first secondary shaft within the space between the first reverse gear wheel and a rolling bearing which rotatably supports the first secondary shaft. The bearing is axially interposed between the first reverse gear wheel and the output pinion of the first secondary shaft.

3 Claims, 2 Drawing Sheets

GEAR CHANGE DEVICE FOR A MOTOR VEHICLE

CROSS REFERENCE TO RELATED APPLICATIONS

This application claims priority from European Patent Application No. 11158282.1 filed on Mar. 15, 2011, the entire disclosure of which is incorporated herein by reference.

The present invention refers to gear change devices for motor vehicles, of the type comprising:
- a first and a second primary shaft coaxial with respect to each other, selectively connectable to the driving shaft of the motor vehicle by means of a double clutch engagement device,
- a first and a second secondary shaft, whose axes are parallel and spaced from the common axis of said primary shafts, and having respective output pinions intended to mesh with a gear wheel of a differential,
- a plurality of pairs of gear wheels, corresponding to a plurality of forward gear ratios and at least one reverse gear ratio, in which the gear wheels of each pair are one rigidly connected in rotation with one of the primary shafts or with one of the secondary shafts while the other is freely rotatable on one of the secondary shafts or on one of the primary shafts respectively,
- a plurality of gear selector devices for rotatably coupling each of said freely rotatable gear wheels with the shaft on which it is mounted, wherein the reverse gear ratio is defined by:
- a first reverse gear wheel mounted freely rotatable on the first secondary shaft and connectable in rotation with the latter by means of one of said selector devices, with the aim of selecting the reverse gear,
- a second reverse gear wheel, which serves as an idler gear wheel for inverting the motion, which meshes with said first reverse gear wheel and which is mounted freely rotatable on the second secondary shaft, said second reverse gear wheel being connected in rotation with a gear wheel rigidly connected in rotation on one of said primary shafts, wherein said gear change device further comprises a fifth shaft parallel and spaced with respect to the common axis of the two primary shafts and with respect to the axes of the two secondary shafts and carrying a further pinion for the meshing with the abovementioned gear wheel of the differential, and a parking gear wheel connected in rotation with said further pinion and cooperating with a locking device for locking the gear change device in a parking condition, wherein said parking gear wheel is mounted freely rotatable around the axis of said fifth shaft, entirely independently with respect to said primary shafts and with respect to said secondary shafts, i.e. without any transmission connection with any of said primary shafts and said secondary shafts.

A gear change device of the above indicated type is known from US 2010/0294059 A1.

The object of the present invention is that of providing a gear change device of the above indicated type which is of simple construction and reduced in dimensions.

In view of achieving this object, the invention provides a gear change device having the above indicated features and further characterized in that said second reverse gear wheel is permanently connected in rotation with a forward gear wheel which is mounted freely rotatable on the abovementioned second secondary shaft and meshes with said gear wheel which is rigidly connected in rotation on one of said primary shafts, and in that said parking gear wheel extends radially towards said first secondary shaft within a space between said first reverse gear wheel and a rolling bearing which rotatably supports said first secondary shaft, said bearing being axially interposed between the first reverse gear wheel and said output pinion of the first secondary shaft.

In a first embodiment, said parking gear wheel is mounted freely rotatable on said fifth shaft, said fifth shaft being mounted fixed within the structure of said gear change device.

In a second embodiment, said parking gear wheel is permanently connected in rotation with said fifth shaft, said fifth shaft being mounted freely rotatable within the structure of said gear change device.

BRIEF DESCRIPTION OF THE DRAWINGS

Further characteristics and advantages of the invention shall be clear from the description that follows with reference to the attached drawings, purely provided by way of example, wherein.

DETAILED DESCRIPTION OF THE INVENTION

Figure 1:
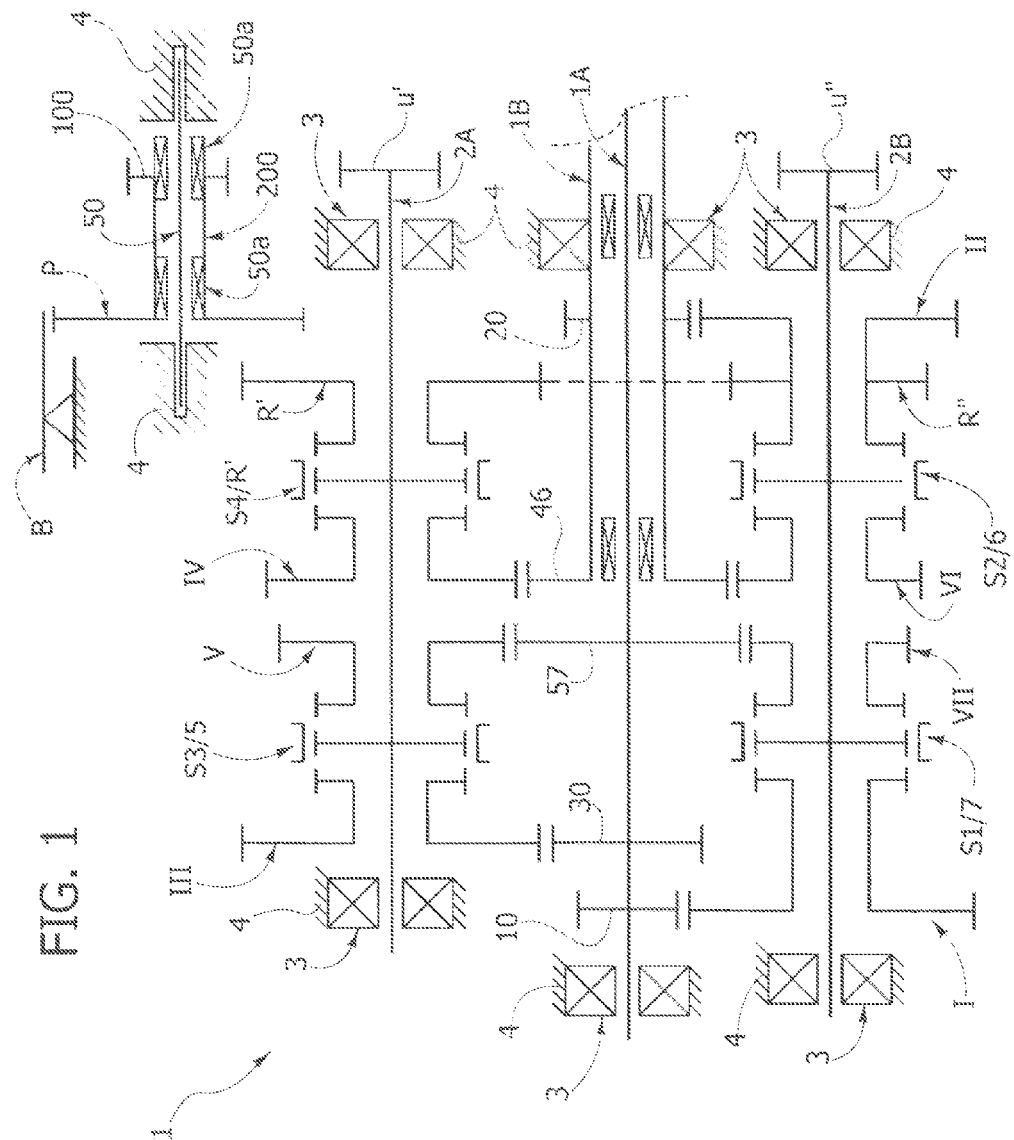
FIG. 1 is a diagram of a first embodiment of the gear change device according to the invention.

In all the embodiments illustrated in the drawings, the gear change device according to the invention comprises a first primary shaft 1A and a second primary shaft 1B coaxial with respect to each other, whose right ends (with reference to the figures) are selectively connectable to the driving shaft of a motor vehicle by means of a double clutch engagement device of any known type (not illustrated).

References 2A, 2B indicate—in their entirety—a first and a second secondary shaft, whose axes are parallel and spaced from the common axis of the two primary shafts 1A, 1B.

For better clarity, the figures show the shafts 1A, 1B, 2A, 2B as if the three axes thereof were arranged in the same plane, while such axes actually are not coplanar, but they are arranged to form a triangle.

All the above-mentioned shafts are rotatably supported by means of roller bearings 3 within the casing 4 of the gear box.

The two secondary shafts 2A, 2B have—at the right ends thereof (with reference to the figures)—output pinions u', u" (which may have the same or different number of teeth) intended to mesh both, in a per se known manner, with a gear wheel of a differential (not illustrated).

The illustrated gear change device has a plurality of pairs of gear wheels, corresponding to the plurality of forward gear ratios and a reverse gear ratio, in which the gear wheels of each pair are one rigidly connected in rotation with one of the primary shafts or with one of the secondary shafts, while the other is freely rotatable respectively, in both cases, on one of the secondary shafts or on one of the primary shafts. Furthermore, still according to the conventional art, the device comprises a plurality of gear selector devices suitable for rotatably coupling each of said freely rotatable gear wheels with the shaft on which it is mounted.

In the illustrated specific case, references I, II, III, IV, V, VI, VII, R" respectively indicate gear wheels freely rotatably mounted on the first or on the second secondary shaft 2A, 2B and couplable with the respective secondary shaft for respectively selecting the first, second, third, fourth, fifth, sixth, seventh gears and the reverse gear.

The gear wheel I meshes with a gear wheel 10 rigidly and permanently connected in rotation with the first primary shaft 1A, i.e. on the inner primary shaft, on one end portion thereof extending beyond the end of the second primary shaft 1B.

The gear wheel II of the second gear meshes with a gear wheel 20 rigidly connected to the primary shaft 1B.

The gear wheel III of the third gear meshes with a gear wheel 30 rigidly connected to the primary shaft 1A.

The gear wheel IV of the fourth gear and the gear wheel VI of the sixth gear both mesh with the same gear wheel 46 rigidly connected to the primary shaft 1B.

The gear wheel V of the fifth gear and the gear wheel VII of the seventh gear both mesh with the same gear wheel 57 rigidly connected to the primary shaft 1A.

The selector devices for rotatably coupling each of the gear wheels I, II, III, IV, V, VI, VII, R" are indicated with references S1/7, S2/6, S3/4, S4/R, each of such selector devices being actuatable in opposite directions for selecting different gears (the digits of the number that follows the reference S indicate the gears thus selectable)

The second forward gear is defined by a pair of gear wheels 20, II, the first permanently connected in rotation with the outermost primary shaft 1B and the other mounted freely rotatable on the second secondary shaft 2B and rotatably couplable therewith through an engagement device schematically illustrated in the drawing and indicated with reference S2/6 (to indicate that such device selects the second gear in one direction and the sixth gear in the other direction).

The reverse gear ratio is defined by a first reverse gear wheel R' which is mounted freely rotatable on the first secondary shaft 2A and it is rotatably couplable therewith through the selector device S4/R and by a second reverse gear wheel R", which serves as an idler gear wheel for inverting the motion and which meshes with the first gear wheel R' (such meshing, diagrammatically shown in the figure by a dashed line, being possible due to the fact that the two axes of the secondary shafts and the common axis of the primary shafts are not contained in the same plane). The second reverse gear wheel R" is permanently connected in rotation with the gear wheel II of the second gear and it is mounted freely rotatable therewith on the second secondary shaft 2B.

With the arrangement described above, the engagement of the reverse gear is obtained by activating the selector device S4/R and leaving the selector device S2/6 disabled, so as to leave the second reverse gear wheel R" freely rotatable on the second secondary shaft 2B. In such situation, the motion coming from the outermost primary shaft 1B is transferred to the gear wheel gear wheel II and therefrom to the gear wheel R", to the gear wheel R' and to the first secondary shaft 2A.

All the characteristics described above are common to all embodiments illustrated in the attached drawings. Still common to all the embodiments is the fact that the gear change device of the invention further comprises a fifth shaft 50 parallel and spaced with respect to the common axis of the two primary shafts 1A, 1B and with respect to the axes of the two secondary shafts 2A, 2B and carrying a further pinion 100 for meshing with the gear wheel of the differential. In the illustrated examples, the pinion 100 is arranged in the same plane in which the pinions u', u" associated to the two secondary shafts 2A, 2B, also intended to mesh with the gear wheel of the differential, are arranged. For the sake of illustration simplicity, the shaft 50 is illustrated as if it were on the same plane as the shafts 1A, 1B, 2A, 2B, while actually this does not occur, given that the two pinions u', u" and the pinion 100 all mesh with the same gear wheel of the differential.

Still common to all the embodiments is the fact that the fifth shaft 50 also carries a parking gear wheel P connected in rotation with the pinion 100 and cooperating with a locking device B supported by the fixed structure of the gear change device, for locking the differential in a parking condition. The construction details of the locking device B are neither described nor illustrated herein, given that such device can be of any known type and it does not fall, considered independently, within the scope of protection of the invention. Furthermore, the elimination of such details from the drawings makes the latter clearer and easier to understand.

In the case of the embodiment of FIG. 1, the fifth shaft 50 is arranged within the structure of the casing 4 of the gear change device, with the ends thereof rigidly anchored to such structure. In the case of such solution, the pinion 100 and the parking gear wheel P are rigidly connected to each other by a shaft 200 mounted freely rotatable on the fifth shaft 50 by means of supports 50a, for example roller bearings or bearing bushings. Hence, both the pinion 100 and the parking gear wheel 50 are freely rotatable within the casing of the device around the axis of the fifth shaft 50.

It should be observed that the parking gear wheel P is freely rotatable around the axis of the fifth shaft 50, entirely independently with respect to the primary shafts 1A, 1B and with respect to the secondary shafts 2A, 2B, i.e. without any transmission connection with any of said primary shafts and said secondary shafts.

When the locking device B is activated, the gear wheel P is locked against the rotation, hence the pinion 100 connected thereto locks the gear wheel of the differential meshing therewith.

A further important feature of the invention lies in that the parking gear wheel P extends radially within the space between the first reverse gear wheel R' and a rolling bearing 3 which supports the first secondary shaft 2A and which is axially interposed between the first reverse gear wheel and pinion u'. This means that the parking gear wheel P has an axial position intermediate between gear wheel R' and the above-mentioned bearing 3 and that the two gear wheels R' and P overlap with each other in a front view. Due to this feature, the space available within the housing of the gear change device is exploited in the best possible manner in order to provide a parking gear wheel P with a relatively large diameter, with the result that the force that the lock device B must support is relatively reduced.

Figure 2:
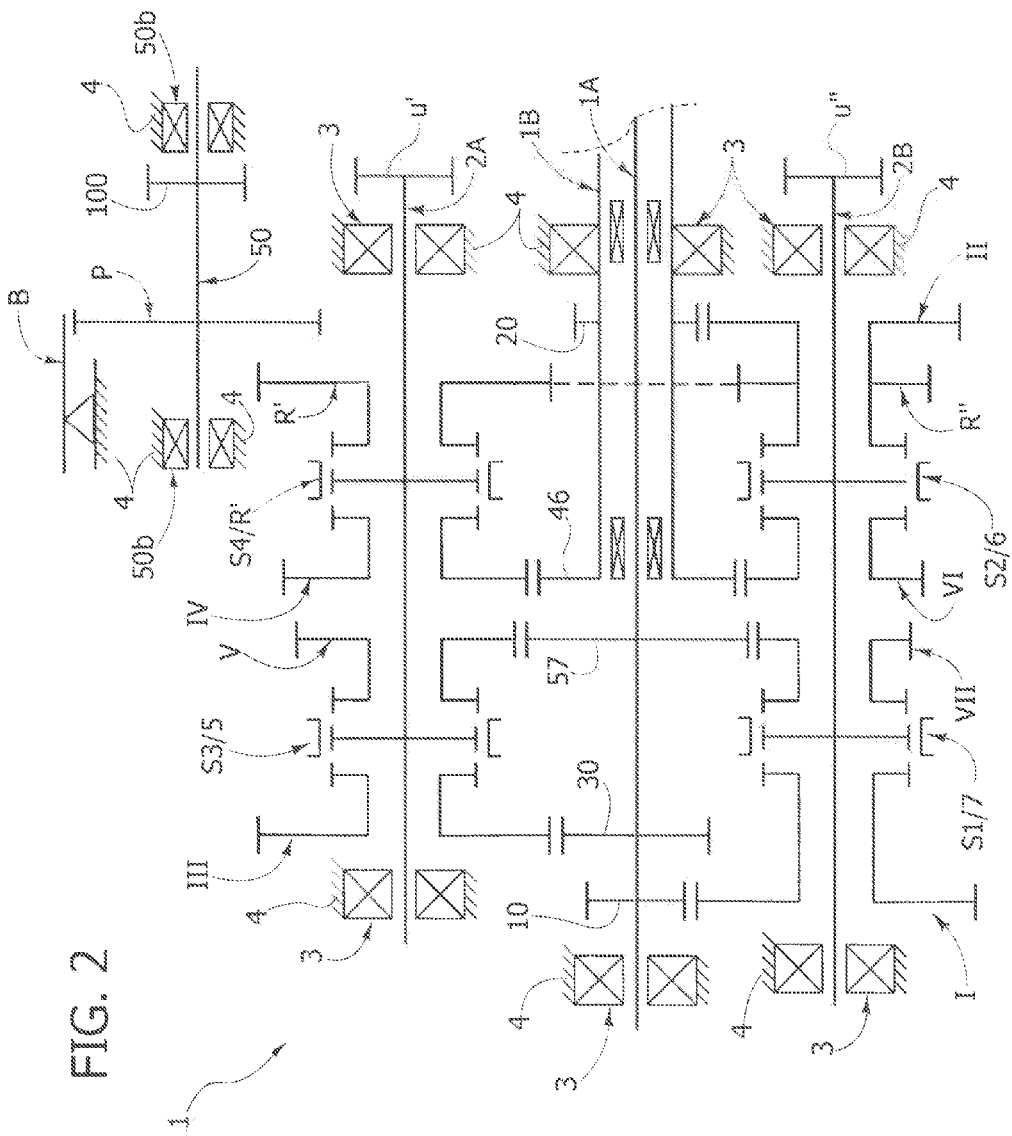
FIG. 2 is a diagram of a second embodiment of the gear change device according to the invention

The embodiment of FIG. 2 is different from that of FIG. 1 due to the fact that in this case the pinion 100 and the parking gear wheel P are directly connected in rotation to the shaft 50, and the latter has the ends thereof supported freely rotatable within the structure 4 of the casing of the gear change device, through supports 50b, for example roller bearings or bearing bushings.

From the foregoing description it clearly appears that in all embodiments of the invention a parking gear wheel freely rotatable around the axis of said fifth shaft 50, entirely independently with respect to the primary shafts 1A, 1B and with respect to the secondary shafts 2A, 2B, i.e. without any transmission connection with any of said primary shafts and said secondary shafts is provided within the casing of the gear change device. The parking gear wheel P is connected in rotation with the pinion 100 meshing with the gear wheel of the differential and it cooperates with the locking device B which, when activated, causes the locking of the differential. The parking gear wheel extends in the space between the first reverse gear wheel R' and the bearing 3 adjacent thereto, so that it can be made with a relatively large diameter without requiring larger dimensions of the entire device and with the advantage of reducing the force which must be supported by device B to provide locking of the device in the parking condition.

Naturally, without prejudice to the principle of the invention, the construction details and the embodiments may widely vary with respect to what has been described and illustrated purely by way of example, without departing from the scope of protection of the present invention.

What is claimed is:

1. Gear change device for a motor vehicle, comprising:
   a first and a second primary shaft coaxial with respect to each other, selectively connectable to a driving shaft of the motor vehicle by means of a double clutch engagement device,
   a first and a second secondary shaft, whose axes are parallel and spaced from the common axis of said primary shafts, and having respective output pinions intended to mesh with a gear wheel of a differential,
   a plurality of pairs of gear wheels, corresponding to a plurality of forward gear ratios and at least one reverse gear ratio, wherein the gear wheels of each pair are one rigidly connected in rotation with one of the primary shafts or with one of the secondary shafts while the other is freely rotatable on one of the secondary shafts or on one of the primary shafts respectively,
   a plurality of gear selector devices for rotatably coupling each of said freely rotatable gear wheels with the shaft on which it is mounted,
   wherein the reverse gear ratio is defined by:
      a first reverse gear wheel mounted freely rotatable on the first secondary shaft and connectable in rotation with the first secondary shaft by means of one of said selector devices, with the aim of selecting the reverse gear,
      a second reverse gear wheel, which serves as an idler gear wheel for inverting the motion, which meshes with said first reverse gear wheel and which is mounted freely rotatable on the second secondary shaft, said second reverse gear wheel being connected in rotation with a gear wheel rotatably rigidly connected on one of said primary shafts,
   wherein said gear change device further comprises a fifth shaft parallel and spaced with respect to the common axis of the two primary shafts and with respect to the axes of the two secondary shafts and carrying a further pinion for meshing with the gear wheel of the differential, and a parking gear wheel connected in rotation with said further pinion and cooperating with a locking device for locking the gear change device in a parking condition,
   wherein said parking gear wheel is mounted freely rotatable around the axis of said fifth shaft, entirely independently with respect to said primary shafts and with respect to said secondary shafts,
   wherein said second reverse gear wheel is permanently connected in rotation with a forward gear wheel which is mounted freely rotatable on the second secondary shaft and meshes with said gear wheel which is rigidly connected in rotation on one of said primary shafts, and in that said parking gear wheel extends radially towards said first secondary shaft within a space between said first reverse gear wheel and a rolling bearing which rotatably supports said first secondary shaft, said hearing being axially interposed between the first reverse gear wheel and said output pinion of the first secondary shaft.

2. Gear change device according to claim 1, wherein said parking gear wheel is mounted freely rotatable on said fifth shaft, said fifth shaft being mounted fixed within a casing of said gear change device.

3. Gear change device according to claim 1, wherein said parking gear wheel is permanently connected in rotation with said fifth shaft, said fifth shaft being mounted freely rotatable within a casing of said gear change device.

* * * * *